(12) United States Patent
Khorram

(10) Patent No.: US 7,245,887 B2
(45) Date of Patent: Jul. 17, 2007

(54) HIGH SPEED CMOS TRANSMIT-RECEIVE ANTENNA SWITCH

(75) Inventor: Shahla Khorram, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 11/516,414

(22) Filed: Sep. 5, 2006

(65) Prior Publication Data

US 2007/0004346 A1    Jan. 4, 2007

Related U.S. Application Data

(63) Continuation of application No. 10/460,605, filed on Jun. 12, 2003, now Pat. No. 7,120,399.

(60) Provisional application No. 60/465,423, filed on Apr. 25, 2003.

(51) Int. Cl.
    *H04B 1/04* (2006.01)
    *H04Q 11/12* (2006.01)

(52) U.S. Cl. .................. 455/121; 455/73; 455/78; 455/80; 330/100; 330/101; 327/365; 327/419; 327/478

(58) Field of Classification Search .......... 455/73, 455/78, 79–80, 82, 83, 121, 414.1, 130, 151.2, 455/333; 333/100, 101; 327/365, 419, 478; 330/100, 101
See application file for complete search history.

(56) References Cited

U.S. PATENT DOCUMENTS

| 5,084,710 | A | | 1/1992 | Whittington |
| 5,502,629 | A | * | 3/1996 | Ito et al. ................ 363/60 |
| 6,078,612 | A | | 6/2000 | Bertrand et al. |
| 6,728,517 | B2 | * | 4/2004 | Sugar et al. ............ 455/73 |
| 6,882,829 | B2 | * | 4/2005 | Mostov et al. .......... 455/83 |
| 2001/0018334 | A1 | | 8/2001 | Ipek et al. |
| 2003/0190895 | A1 | * | 10/2003 | Mostov et al. .......... 455/78 |

* cited by examiner

*Primary Examiner*—Tony T. Nguyen
(74) *Attorney, Agent, or Firm*—Garlick Harrison & Markison

(57) ABSTRACT

A high-speed CMOS transmit/receive antenna switch includes a first transistor, a second transistor and a parasitic compensation network. The first transistor is operably coupled to an antenna, to a transmit path, and to receive a transmit/receive (T/R) control signal. The second transistor is operably coupled to the antenna, the receive path, and to receive the T/R control signal. When the T/R control signal is in a first state, the first transistor is active and the second transistor is inactive such that the transmit path is coupled to the antenna. When the T/R control signal is in a second state, the second transistor is active and the first transistor is inactive such that the receive path is coupled to the antenna. The parasitic compensation network is coupled to compensate for adverse effects of parasitic components of the first and second transistors at operating frequencies of the transmit/receive antenna switch.

9 Claims, 6 Drawing Sheets

T/R switch module 73

I/R switch module 73

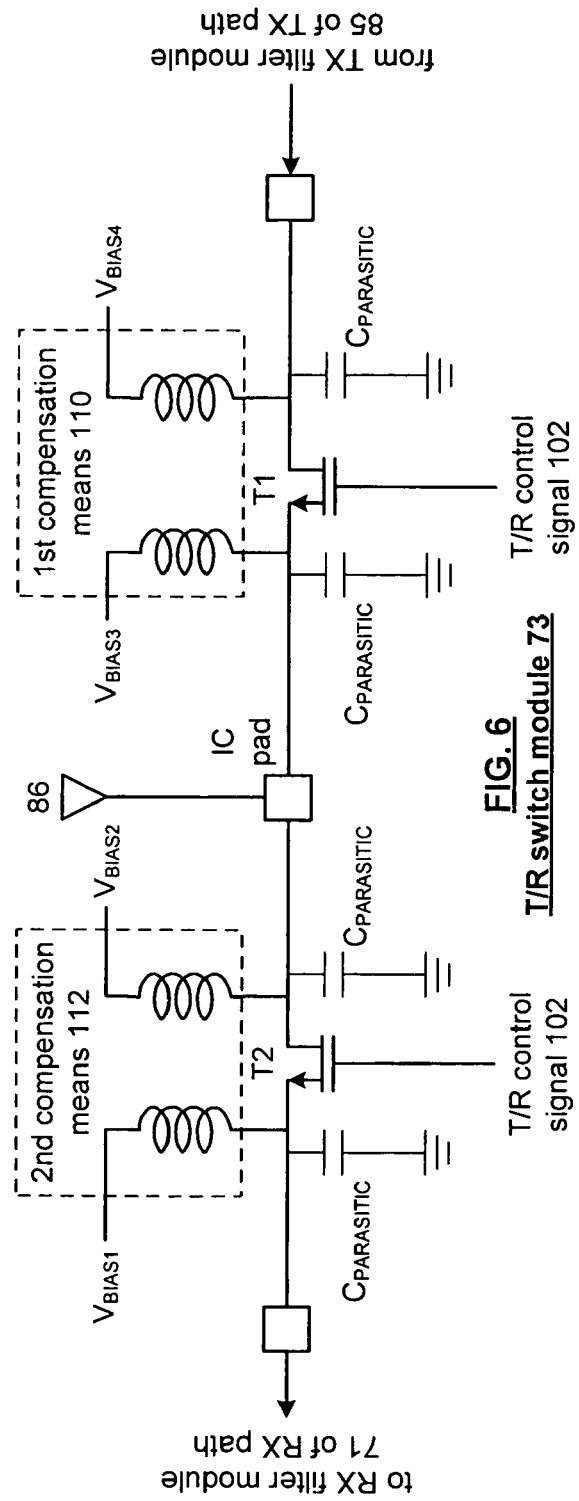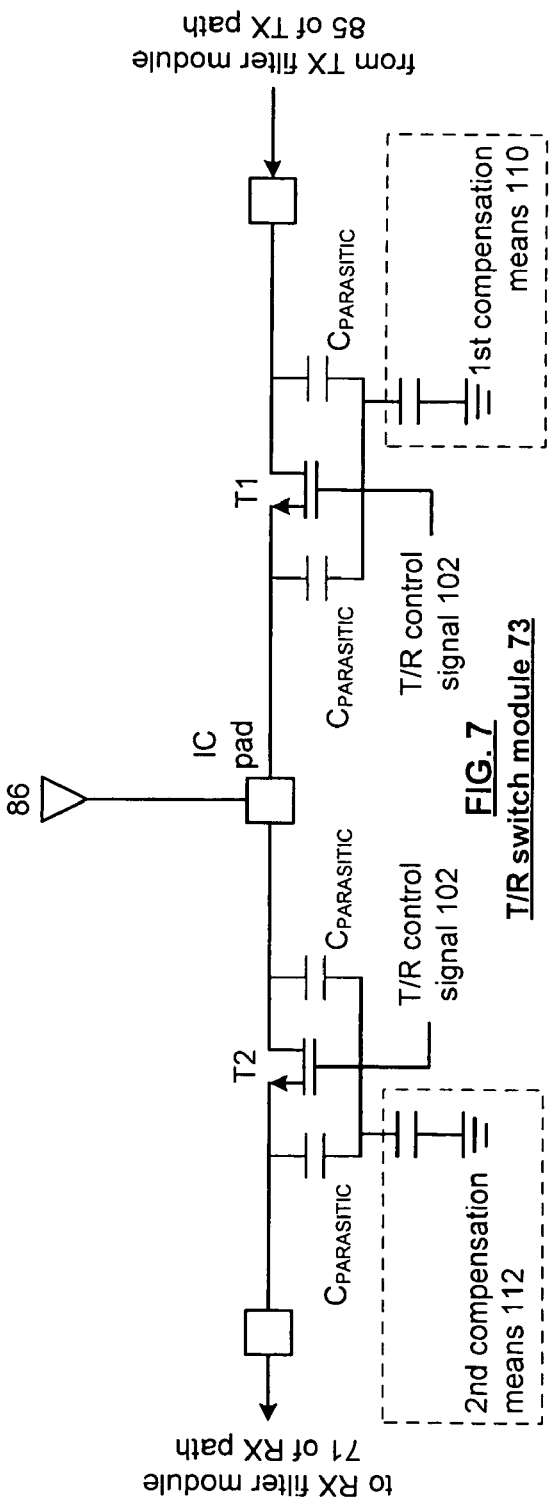

HIGH SPEED CMOS TRANSMIT-RECEIVE ANTENNA SWITCH

CROSS REFERENCE TO RELATED APPLICATION

This application is a continuation of and claims priority to U.S. patent application having an application No. 10/460,605; filed Jun. 12, 2003 now U.S. Pat. No. 7,120,399; which application claims priority to U.S. Provisional Patent Application No. 60/465,423, filed Apr. 25, 2003; and in which both applications are incorporated herein by reference in this application.

BACKGROUND OF THE INVENTION

1. Technical Field of the Invention

This invention relates generally to wireless communications systems and more particularly to wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Even though wireless communication devices include a transmitter and receiver, they generally communicate in a half duplex manner, i.e. they are either transmitting or receiving. As such, a wireless communication device may include a single antenna structure, which may include one antenna or a diversity antenna structure that is shared by the receiver and the transmitter of the device. To facilitate the sharing of the antenna structure, the wireless communication device includes at least one transmit/receive (T/R) switch.

In general the T/R switch couples either the receiver path or the transmitter path of the wireless communication device to the antenna structure. Since the T/R switch is coupling radio frequency (RF) signals in the megahertz to gigahertz range, the T/R switch must have a stable frequency response over the frequency range of interest. As such, the T/R switch is generally an off chip device or is fabricated using gallium arsenide integrated circuit process. Neither implementation is ideal for a CMOS implemented radio frequency integrated circuit (RFIC).

Another issue with T/R switches is when used by a wireless communication device that employs a diversity antenna structure. As is known, a diversity antenna structure includes two or more antennas that are physically separated (e.g. by a quarter wave length, half wave length, or full wave length) but receive the same signal. The antenna that receives the signal with the largest signal strength is selected for use by the wireless communication device. For a two antenna diversity structure, the wireless communication device includes two transmit receive switches: one to select the transmit or receive path and the other to select the first or second antenna. In this instance, since the RF signals are traversing two T/R switches, the T/R switches need to be extra clean (i.e. have a flat frequency response over the frequency range of interest and induce very little noise) making it essential to use off chip T/R switches or gallium arsenide integrated circuit T/R switches in conjunction with a CMOS radio frequency integrated circuit, which dramatically adds to the cost of a radio frequency integrated circuit.

Therefore, a need exists for an on chip implementation of a transmit receive switch that provides clean RF switching for single or diversity antenna structures.

BRIEF SUMMARY OF THE INVENTION

The high-speed CMOS transmit/receive antenna switch of the present invention substantially meets these needs and others. In an embodiment of a high-speed CMOS transmit/receive antenna switch includes a first transistor, a second transistor and a parasitic compensation network. The first transistor is operably coupled to an antenna, to a transmit path, and to receive a transmit/receive (T/R) control signal. The second transistor is operably coupled to the antenna, the receive path, and to receive the T/R control signal. When the T/R control signal is in a first state, the first transistor is active and the second transistor is inactive such that the transmit path is coupled to the antenna. When the T/R control signal is in a second state, the second transistor is active and the first transistor is inactive such that the receive path is coupled to the antenna. The parasitic compensation network is coupled to the first and second transistors to compensate for adverse effects of parasitic components of the first and second transistors at operating frequencies of the high speed CMOS transmit/receive antenna switch. Accordingly, by compensating for the parasitic components (e.g. parasitic capacitance) of the first and second transistors, a desired frequency response for the T/R switch may be obtained such that a T/R switch may be implemented utilizing CMOS technology on a radio frequency integrated circuit.

In another embodiment, the high speed CMOS transmit/receive antenna switch includes a first transistor, a second transistor, a first compensation means, and a second compensation means. The first transistor is operable to couple a transmit path to the antenna when a T/R control signal is in a first state. The second transistor is operable to couple a receive path to the antenna when the T/R control signal is in a second state. The first compensation means is operably coupled to the first transistor to provide a corrective frequency response with respect to the adverse frequency responses produced via parasitic components of the first transistor at operating frequencies of the T/R antenna switch. The second compensation means is operably coupled to the second transistor to provide a second corrective frequency response with respect to the adverse frequency response produced via parasitic components of the second transistor at the operating frequencies of the high speed CMOS T/R antenna switch. Accordingly, by compensating for the parasitic components of the first and second transistors, a CMOS T/R switch may be implemented on chip and obtain the desired frequency responses of off chip T/R switches and/or gallium arsenide implemented T/R switches.

BRIEF DESCRIPTION OF THE SEVERAL VIEWS OF THE DRAWINGS

FIG. 6 is a schematic block diagram of a further transmit/receive switch module in accordance with the present invention; and FIG. 7 is a schematic block diagram of a still further transmit/receive switch module in accordance with the present invention.

DETAILED DESCRIPTION OF THE INVENTION

Figure 1:
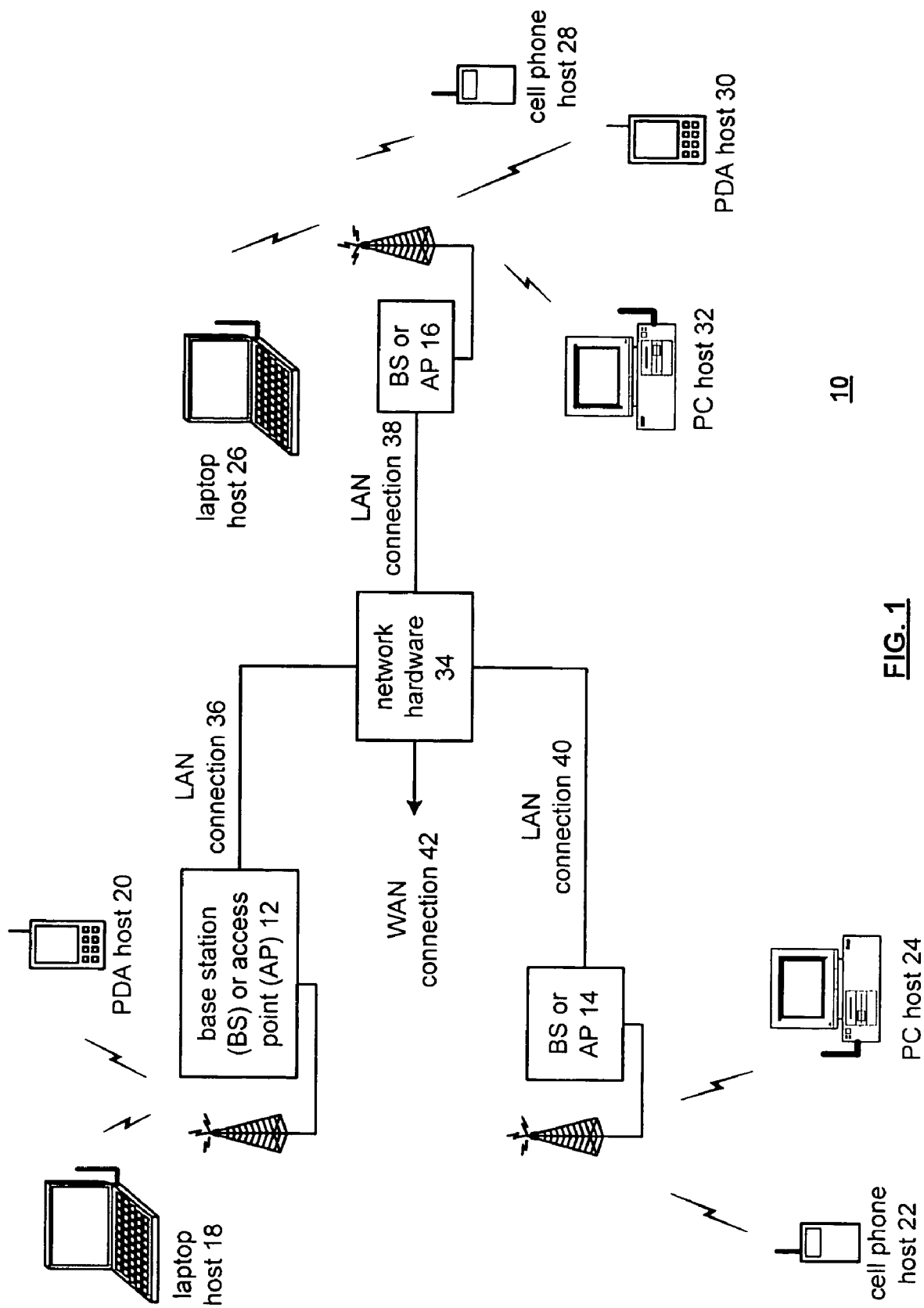
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
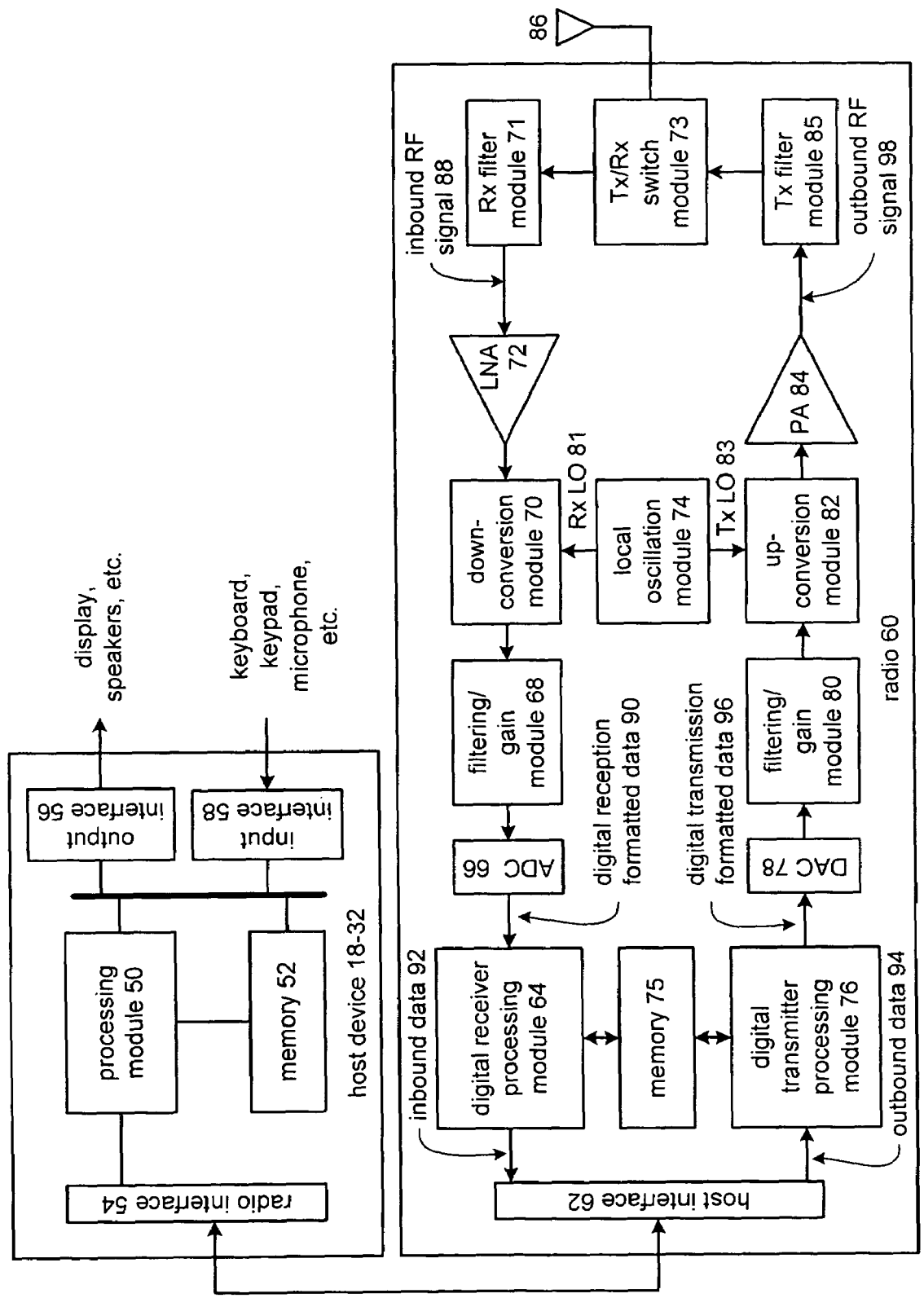
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74, which may be implemented in accordance with the teachings of the present invention. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
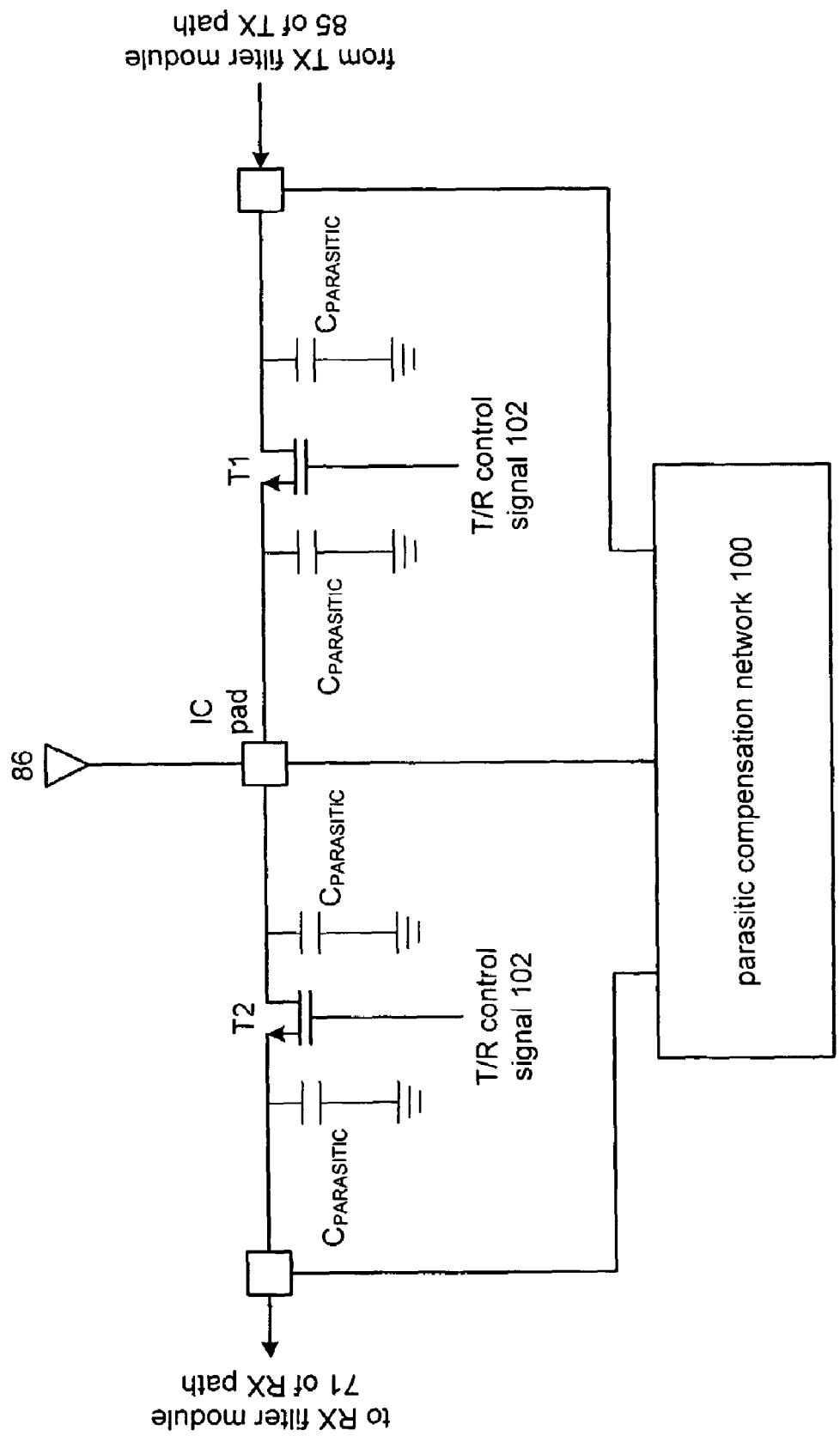
FIG. 3 is a schematic block diagram of a transmit/receive switch module in accordance with the present invention.

FIG. 3 is a schematic block diagram of T/R switch module 73 that includes a first transistor T1, a second transistor T2 and a parasitic compensation network 100. Each of the transistors T1 and T2 may be implemented in CMOS and should have a low on resistance (e.g. 2 ohms or less), which creates a significant parasitic capacitance between the body of the transistor and the substrate of the integrated circuit. Thus, without compensation, the parasitic capacitance at the radio frequencies (e.g., in the hundreds of megahertz to multiple gigahertz) would substantially attenuate the received signals via antenna 86 and/or substantially attenuate the outbound R/F signals from the transmit filter module 85 of the transmit/receive path.

The parasitic compensation network 100 is operably coupled to the transistors T1 and T2 to substantially compensate for the adverse effects of the parasitic capacitance (e.g., the unwanted attenuation of radio frequency signals). This may be done by including inductors coupled in parallel with the parasitic capacitance of the transistors where the inductor is tuned to resonant with the parasitic capacitance at the operating frequencies of the radio, (e.g. in the hundreds of megahertz to multiple gigahertz). As one of average skill in the art will appreciate, transistors T1 and T2 may have other parasitic components including inductances, resistances, etc. The parasitic compensation network 100 may further compensate for the frequency response of the transistors based on the parasitic capacitance, resistance and/or inductance.

In operation, the T/R control signal 102 enables transistor T1 or transistor T2. For coupling of the transmit filter module 85 of the transmit path to the antenna 86 via at least one integrated circuit pad, the T/R control signal 102 activates transistor T1 while deactivating transistor T2. Conversely, when the transmit switch module 73 is to couple the receive filter module 71 of the receiver path to the antenna 86, the T/R control signal 102 activates transistor T2 and deactivates transistor T1. Accordingly, by including the parasitic compensation network 100 transistors T1 and T2 may be fabricated utilizing CMOS integrated circuit technology and used to provide an on chip implementation of T/R switch module 73 for high frequency radio applications (e.g. for frequencies ranging from a few hundred megahertz to multiple gigahertz).

Figure 4:
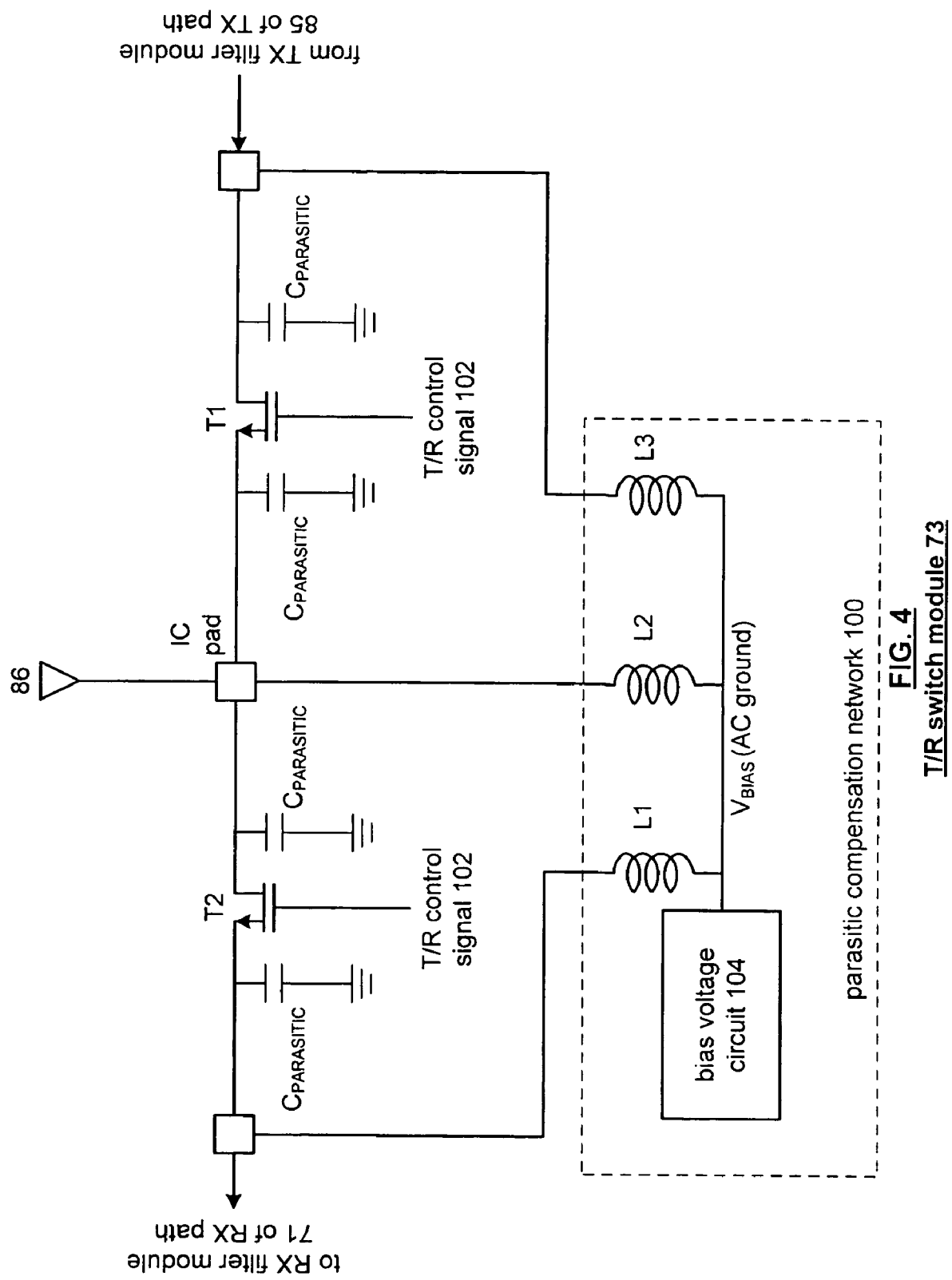
FIG. 4 is a schematic block diagram of another transmit/receive switch module in accordance with the present invention.

FIG. 4 is a schematic block diagram of a transmit/receive switch module 73 that includes transistors T1 and T2 and the parasitic compensation network 100. In this embodiment, the parasitic compensation network 100 includes three inductors L1-L3 and a bias voltage circuit 104. The bias voltage circuit 104 establishes a bias voltage ($V_{bias}$) that functions as an AC ground for the inductors L1-L3. Typically, the bias voltage will correspond to the zero voltage level of differential signaling used within the wireless communication device.

Inductors L1 and L3 will have a similar inductance value to compensate for the parasitic capacitance of T2 and T1 coupled to the receive path and transmit path respectively. L2 will have an inductance value of approximately twice that of L1 or L3 since it is compensating for the parasitic capacitance produced by T2 and T1 coupled to the integrated circuit pad that is coupled to antenna 86. Accordingly, the inductance values are tuned to resonate with the parasitic capacitance (i.e., form a tank circuit) at the operating frequencies of the wireless communication device, which may be in the range of a few hundred megahertz to multi gigahertz. Such compensation allows low on resistance CMOS transistors to be used in an on chip T/R switch without the adverse effects of the parasitic components, which severely dampen the RF signals if left uncompensated.

Figure 5:
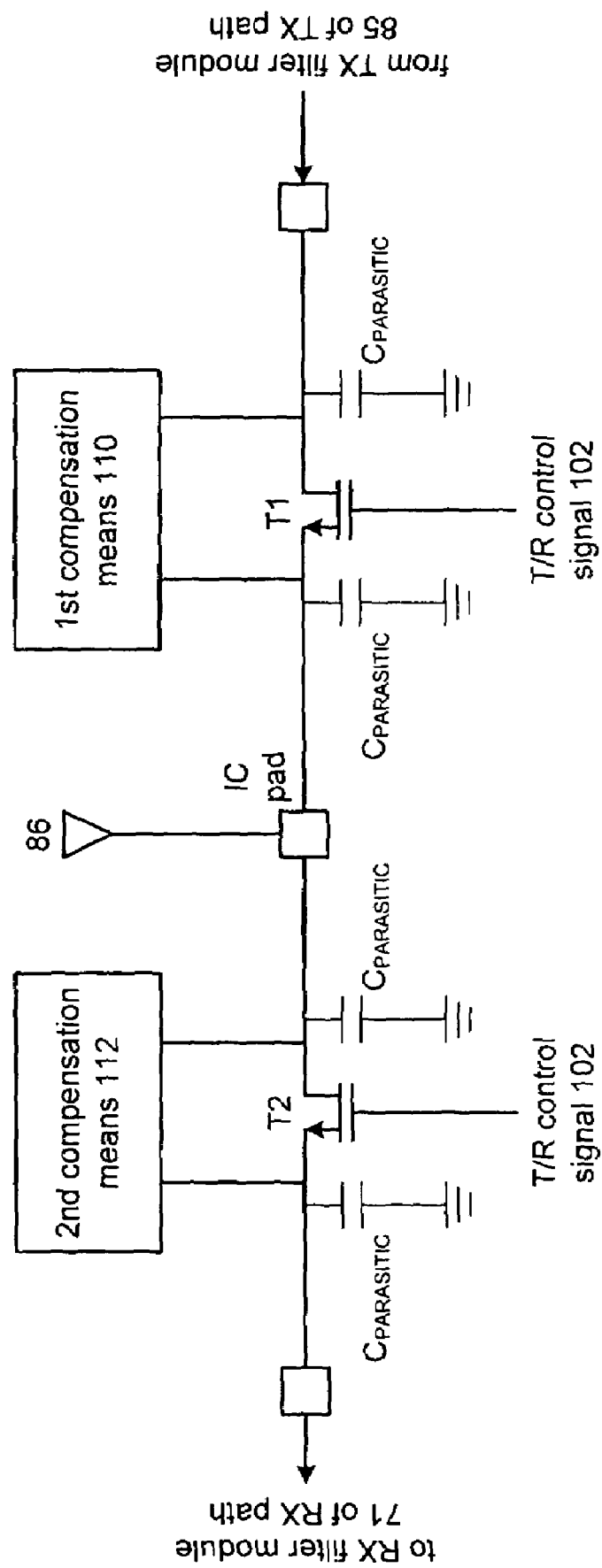
FIG. 5 is a schematic block diagram of yet another transmit/receive switch module in accordance with the present invention.

FIG. 5 is a schematic block diagram of another T/R switch module 73 that includes transistors T1 and T2 and compensation means 110 and 112. Each transistor T1 and T2 includes corresponding parasitic capacitances as shown and is gated based on the T/R control signal 102. The first compensation means 110 is operably coupled to transistor T1 to compensate for the parasitic components of T1 such that at the operating frequencies of the wireless communication device, minimal adverse effect of the transmitted RF signals is achieved. Similarly, the second compensation means 112 compensates for the parasitic components of transistor T2 such that received RF signals via antenna 86 and provided to the received path are substantially unaffected (e.g., have attenuation of no more than a few dB) by the parasitic components of transistor T2.

FIG. 6 illustrates a schematic block diagram of T/R switch module 73 that includes an example of the first and second compensation means 110 and 112. In this illustration, the first and second compensation means each includes inductors that are coupled to the corresponding transistors T1 or T2 and to separate bias voltages, which may be produced from a single bias voltage source with four separate R-C low pass filters. The values of the inductors are tuned to resonate with the parasitic capacitance of the corresponding transistors such that the parasitic components have minimal adverse effects on the transmitted RF signals or received RF signals.

FIG. 7 illustrates yet another diagram of the T/R switch module 73 where the first and second compensation means 110 and 112 include capacitance. As previously mentioned, the parasitic capacitance of T1 and T2 is attributed to the capacitance produced between the body of the transistors and the substrate. In previous illustrations, the substrate was coupled to the ground terminal for the integrated circuit. In this illustration, the substrate for the transistors is coupled via a capacitor to ground. In this structure, the parasitic capacitance is coupled in series with the compensation capacitance such that the series combination of the capacitance is at a value that, at operating frequencies of the wireless communication device, has negligible effect on the received RF signals and/or the transmitted RF signals.

The preceding discussion has presented an on chip transmit receive (T/R) switch that may be implemented utilizing CMOS technology for inclusion on a radio frequency integrated circuit. By compensating for the parasitic components of CMOS transistors, the adverse effects induced by such parasitics without compensation are substantially averted. As one of average skill in the art will appreciate, other embodiments may be derived from the teaching of the present invention without deviating from the scope of the claims.

What is claimed is:

1. An apparatus comprising:
    a first transistor coupled to an antenna, to a transmit path, and to receive a transmit/receive (T/R) control signal;
    a second transistor coupled to the antenna, to a receive path, and to receive the T/R control signal, wherein when the T/R control signal is in a first state, the first transistor is active to couple the transmit path to the antenna and the second transistor is inactive and, when the T/R control signal is in a second state, the second transistor is active to couple the receive path to the antenna and the first transistor is inactive; and
    parasitic compensation network coupled to the first and second transistors to compensate for parasitic effects at operating frequencies of the first and second transistors, the parasitic compensation network including a first inductor coupled to a first node between the first transistor and the transmit path and to AC ground, second inductor coupled to a second node between the second transistor and the receive path and to the AC ground, and a third inductor coupled to a third node between the first transistor, the second transistor and the antenna and to the AC ground.

2. The apparatus of claim 1 further comprising a bias voltage circuit coupled to produce a bias voltage that, at the operating frequencies of the first and second transistors, operates as the AC ground.

3. The apparatus of claim 1, wherein the first and second transistors are CMOS transistors.

4. The apparatus of claim 3, wherein the first and second transistors form a high-speed T/R antenna switch.

5. The apparatus of claim 4, wherein the T/R antenna switch is implemented in a wireless communication device.

6. An apparatus comprising:
a first transistor coupled to an antenna, to a transmit path, and to receive a transmit/receive (T/R) control signal;
a second transistor coupled to the antenna, to a receive path, and to receive the T/R control signal, wherein when the T/R control signal is in a first state, the first transistor is active to couple the transmit path to the antenna and the second transistor is inactive and, when the T/R control signal is in a second state, the second transistor is active to couple the receive path to the antenna and the first transistor is inactive;
first compensation means coupled to the first transistor to provide a corrective frequency response to parasitic effects at operating frequencies of the first transistor, the first compensation means including at least one of a first inductor coupled to at least partially compensate for the parasitic effects of the first transistor and a first capacitor coupled to at least partially compensate for the parasitic effects of the first transistor; and
second compensation means coupled to the second transistor to provide a corrective frequency response to parasitic effects at operating frequencies of the second transistor, the second compensation means including at least one of a second inductor coupled to at least partially compensate for the parasitic effects of the second transistor and a second capacitor coupled to at least partially compensate for the parasitic effects of the second transistor.

7. The apparatus of claim 6, wherein the first and second transistors are CMOS transistors.

8. The apparatus of claim 7, wherein the first and second transistors form a high-speed T/R antenna switch.

9. The apparatus of claim 8, wherein the T/R antenna switch is implemented in a wireless communication device.

* * * * *